UNITED STATES PATENT OFFICE.

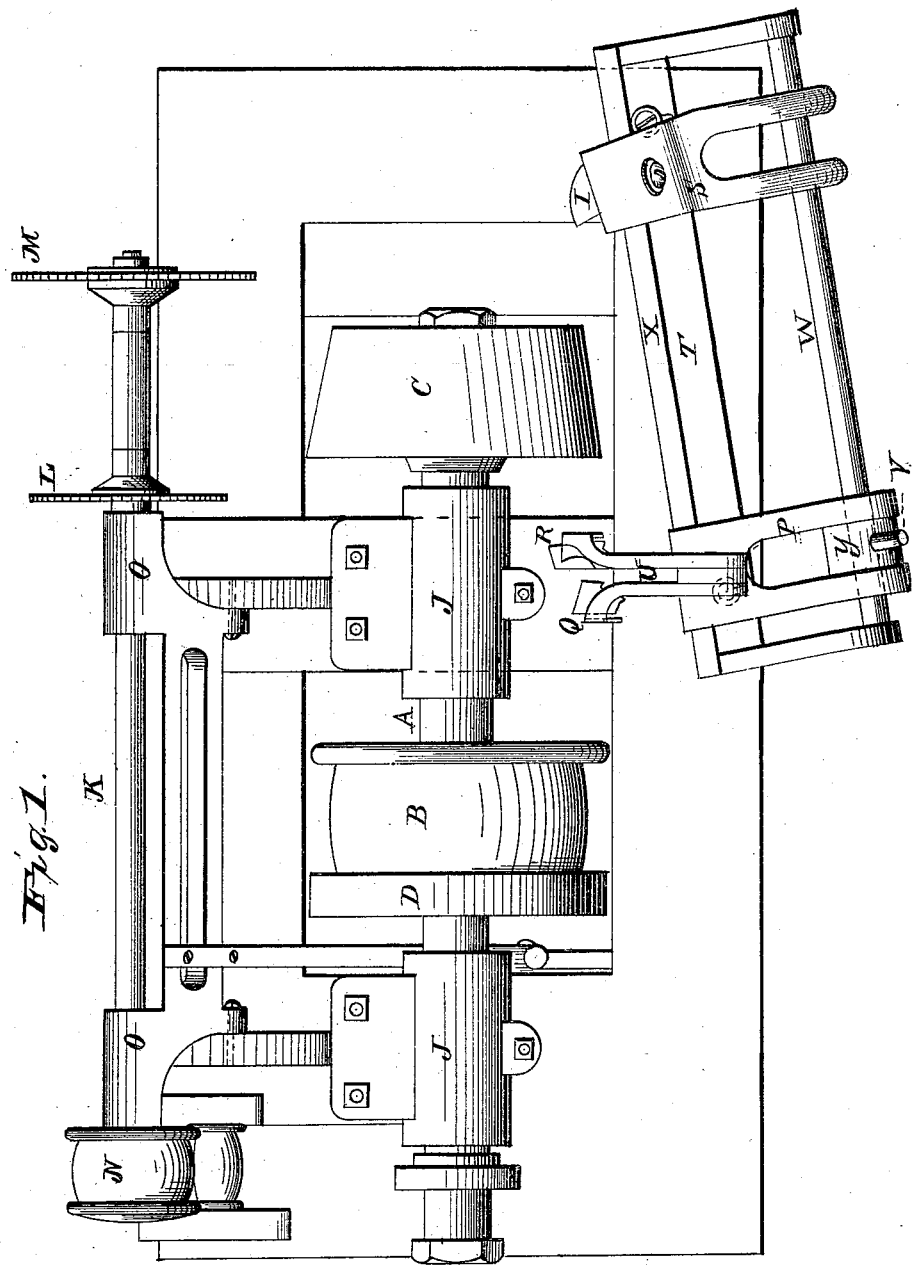

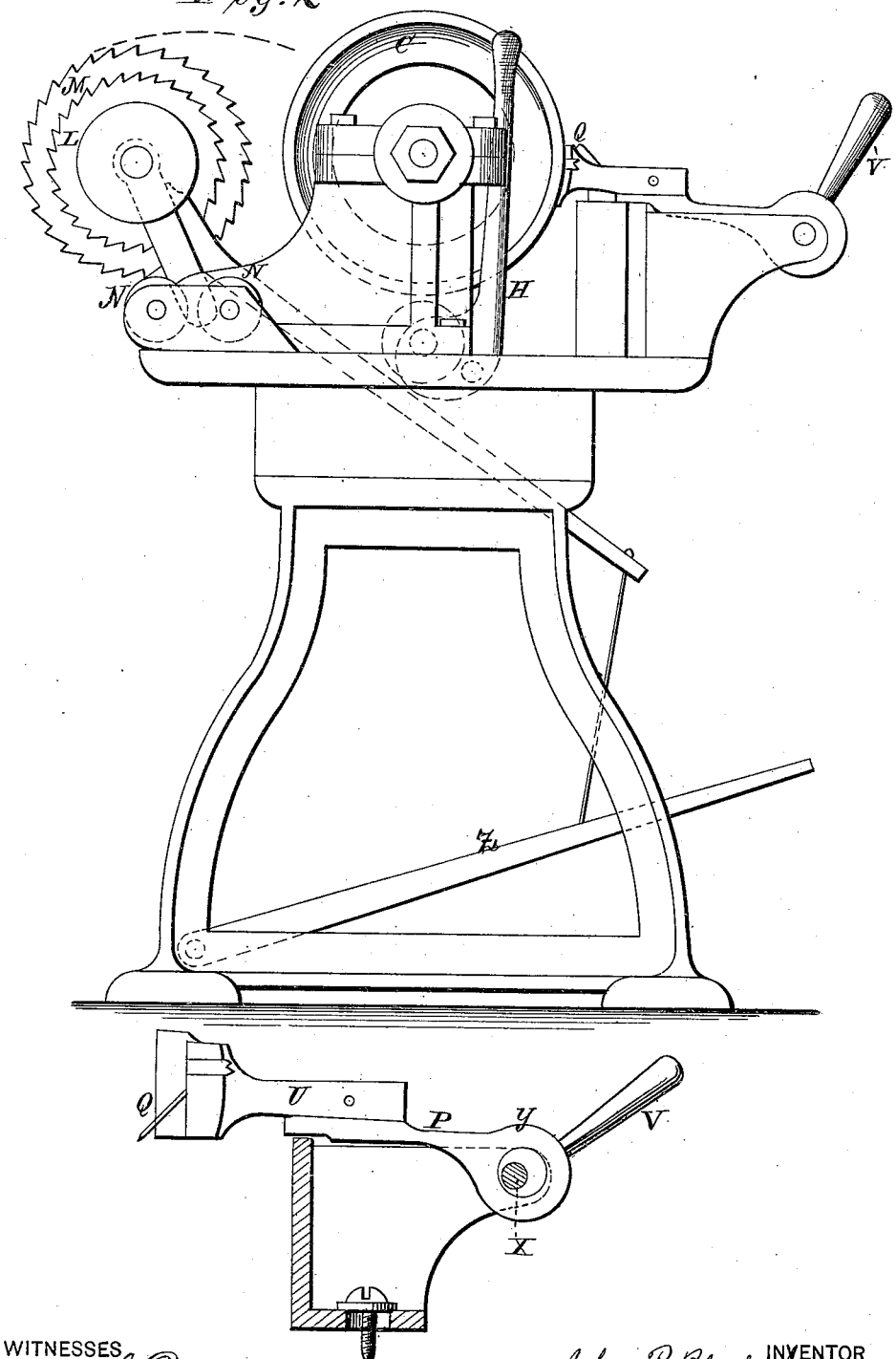

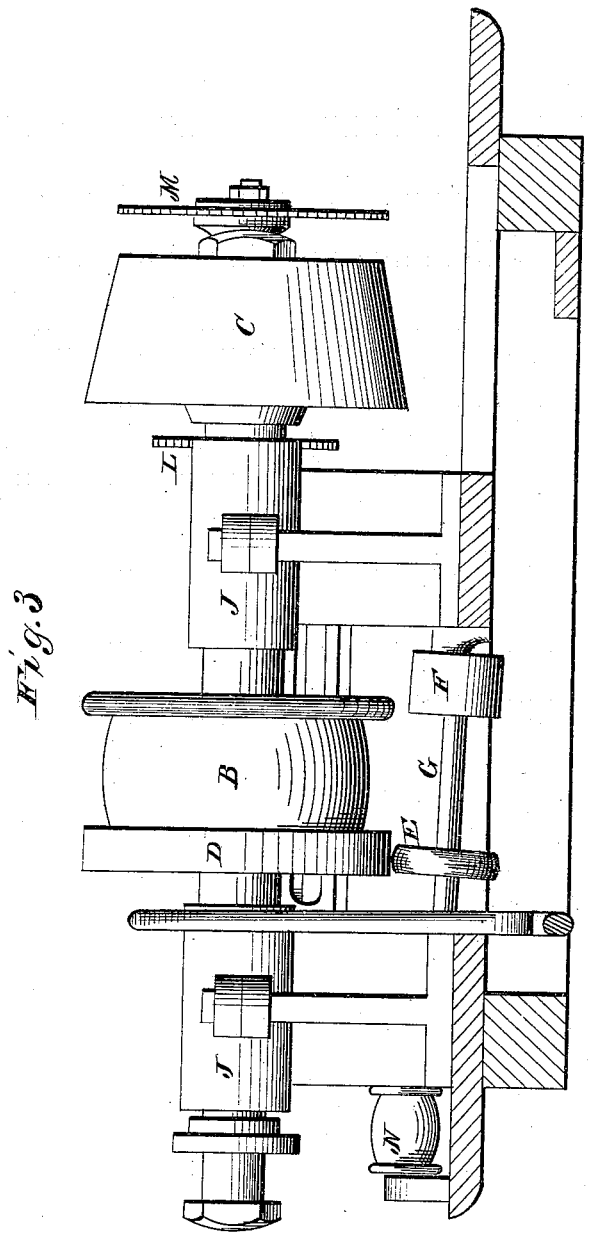

JOHN P. BLOOD AND SAMUEL N. BLOOD, OF ATHENS, PENNSYLVANIA.

IMPROVEMENT IN MACHINES FOR MAKING KITS AND BUCKETS.

Specification forming part of Letters Patent No. 191,099, dated May 22, 1877; application filed September 23, 1876.

*To all whom it may concern:*

Be it known that we, JOHN P. BLOOD and SAMUEL N. BLOOD, of Athens, in the county of Bradford, and in the State of Pennsylvania, have invented certain new and useful Improvements in Machines for Making Kegs and Buckets; and do hereby declare that the following is a full, clear, and exact description thereof, reference being had to the accompanying drawings, and to the letters of reference marked thereon, making a part of this specification.

The nature of our invention consists in the construction and arrangement of a coopering-machine for kits and pails, as will be hereinafter more fully set forth.

In order to enable others skilled in the art to which our invention appertains to make and use the same, we will now proceed to describe its construction and operation, referring to the annexed drawings, in which—

Figure 1 is a plan view of our machine. Fig. 2 is a side elevation, and Fig. 3 a longitudinal section, of the same.

In these figures, A represents the main shaft of the machine carrying the driving-pulley and the bunk.

B represents the driving-pulley secured on the shaft A.

C is the bunk on the end of the shaft A.

D represents a friction-pulley attached to or formed with the driving-pulley B, for driving the shaft A by friction (from a line-pulley beneath) for slower or different speeds required.

J J represent bearings or boxes for the shaft A.

K represents a swinging shaft or arbor carrying the two circular saws L and M, for cutting the kits or pails to the proper length.

L and M represent the two circular saws of different diameter, fastened on the arbor or shaft K.

N is a driving-pulley on the shaft or arbor K.

O O represent swinging bearings or boxes carrying the saw-arbor K.

T represents an adjustable table, upon which the guideways X and shaft W, for carrying the tool-stocks P and S, are mounted.

W represents a round iron shaft attached to the table T, and upon which one end of the tool-stocks P and S are mounted, and upon which they turn and traverse lengthwise.

X represents the guide-rest attached to the table T, and upon which the tool-stocks P and S rest and travel when in operation.

U represents the double or right and left hand adjustable cutter-head, to which the cutting-tools for chamfering, howeling and crozing are affixed.

R represents the cutters attached to the right-hand side of the cutter-head U, and which operate within the large or left end of the kit.

Q represents the cutters attached to the left-hand side of the cutter-head U, and which operate within the small or right-hand end of the kit.

P represents the tool-stock to which the double cutter-head U is attached and adjustable. This stock is mounted upon an eccentric sleeve, which sleeve is in turn mounted on the shaft W of the adjustable table T.

Y represents the eccentric or cam sleeve which carries the tool-stock P, and is mounted on the shaft W.

V represents a lever or handle attached to the eccentric or cam sleeve, to actuate the same for moving the tool-stock toward and from the work when in operation.

S represents a second tool-stock, carrying the turning-chisels I for finishing the outside of the kit. This tool-stock is mounted by one end upon the shaft W, and turns and traverses upon the same, and when in operation the cutter end is supported by and upon the guide-rest X of the table T.

E represents the lower friction-pulley beneath the friction-pulley D, and is mounted upon a line-shaft, G, which shaft connects it with its driving-pulley F for giving a slow motion to the friction-pulley D and main shaft A, for feeding the saws while they are cutting the staves to the required length.

H represents a bent lever carrying one end of the shaft G of the friction-pulley E, for raising and lowering said pulley in and out of contact with the friction-pulley D.

Z represents a foot-lever for actuating the swinging saw-arbor, and putting the saws L and M in and out of motion at the one movement of the lever.

The table T with its shaft W and the guide-rest X is made adjustable, and confined to the bed of the machine in any position required for different bevels and diameters of kits and pails to be made.

The swinging saw-mandrel, with its collars and nuts, is so constructed as to admit of the saws being mounted at any desired different positions and distances between them, to suit the different lengths of kits and pails, as required.

The object of our invention is to facilitate and cheapen the manufacture of that class of cooperage known as pails, kits, and firkins, and at the same time to produce superior and absolutely uniform articles in all particulars, as to quality, dimensions, and style of finish.

The staves for the purpose are first prepared by the machinery in common use, when they are set up with two tress-hoops, one at each end, slightly driven, forming the kit or pail of the size required. This kit or pail is then forced upon the bunk C of this machine sufficiently tight to adhere to the same during the process of manufacturing.

When this is properly done, the staves project about two inches at each end beyond the bunk. The operator then, by depressing the foot-lever Z, brings forward the swinging saw-arbor and saws, and by the same movement the saws are set in rapid motion. The operator simultaneously depresses the bent lever H, causing the friction-pulley E to engage the driving-pulley B, and give a slow revolving motion to the shaft A and the bunk and kit, by which process the saws cut off both ends of the staves of the kit at the same time, thus determining the length of the kit.

When this is done both levers are relaxed, and the motions of the saws and kit cease.

The operator then, by means of another lever, brings the main driving-wheel in action upon the driving-pulley B, giving to the shaft A and bunk and kit a rapid velocity. He then moves the tool-stock P, with the lever V in vertical position, forward from left to right in a horizontal position along the shaft W and guide-rest X toward the kit at its large end to an adjustable stop on the guide-rest, which brings the cutter-head U and its cutters R within the kit to the required position for chamfering, howeling, and crozing the large end of the kit.

By moving the lever V toward and downward, the eccentric sleeve-connection brings the cutter-head and cutters R into action upon the inside of the kit next toward the operator, when the chamfering, howeling, and crozing are instantly and simultaneously completed at that end of the kit, making it ready for its head to be inserted.

This done, the lever V is returned to its first or vertical position. The tool-stock P, with its cutter-head, is withdrawn from the kit toward the left sufficient to clear said kit, when it is changed from its horizontal to a perpendicular position, and then moved along the shaft W toward the right sufficiently to pass the kit, when the tool-stock is again lowered to the horizontal position upon the guide-rest X.

The operator then moves the tool-stock from right to left along the shaft W to an adjustable stop upon the guide-rest, which brings the cutters Q within the small end of the kit to the position for action, as in the large end, when the lever V is again brought toward the operator and downward, causing the cutters to move into action, and completing the chamfering, howeling, and crozing instantly and simultaneously, and finishing that end also ready for receiving the head. The lever V is then restored to its vertical position, and the tool-stock P withdrawn from the kit and raised upward, and then moved along the shaft W to the extreme left, and there remains until required for the next kit.

The kit or pail having been set up with tress-hoops at each end offers the entire outer surface between the hoops to be operated upon, which is done as follows:

The tool-stock S, with its turning-chisels and chisels I, is also mounted upon the shaft W, and movable along its whole length, and also slides upon the guide-rest X, and when not in use is allowed to hang downward at the extreme right-hand end of the shaft W, and clear of the working of the machine.

In using it, the tool-stock S is raised to a vertical position, and moved along the shaft W until it is just past the tress-hoop on the small end of the kit, when the said tool-stock is lowered to the guide-rest, and the turning-chisels are brought into cutting action upon the outside of the kit near the tress-hoop. Once in cutting position, the stock S is gradually moved along the shaft and guide-rest by hand to a stop just before reaching the tress-hoop on the large end of the kit, thus turning off and finishing the outside of the kit between the tress-hoops. The tool-stock S is then raised from the kit and guide-rest, and allowed to hang downward until required to complete the ends of the kit after the removal of the end tress-hoops.

The motion of the machine is stopped, and another tress-hoop slid upon and over the small end of the kit and its hoop, and forced along toward the middle of the kit, where it is tightly driven. The other two tress-hoops are then removed, the machine again put in motion, the tool-stock S, with its chisels I, brought back over and upon the guide-rest X, and then moved along the unfinished portions at each end of the kit, first at the large end, and afterward at the small end, after which the tool-stock is thrown back from the work, and moved along the shaft W to the extreme right hand, and allowed to hang downward until again required for the next kit.

The kit, now being finished, is removed from the bunk, and another is substituted, and the process repeated.

Having thus fully described our invention, what we claim as new, and desire to secure by Letters Patent, is—

1. The combination of the laterally-adjustable table T, the shaft W, the guide-rest X, and the tool-stock P S, all constructed substantially as and for the purposes herein set forth.

2. The swinging saw-mandrel K, with saws L M, in combination with the overhanging bunk C, for the purposes herein set forth.

3. The combination of the main shaft A, bunk C, friction-pulleys D and E, and the swinging saw-mandrel, with saws, substantially as and for the purpose herein set forth.

In testimony that we claim the foregoing we have hereunto set our hands this 13th day of September, 1876.

JOHN P. BLOOD.
SAMUEL N. BLOOD.

Witnesses:
C. A. BLOOD,
L. SANFORD.